United States Patent

[11] 3,554,137

| [72] | Inventors | Pierre Carre;<br>Pierre Tanguy; Jean LeBoulbouech, 2 rue Bodelio, Lorient, France |
|---|---|---|
| [21] | Appl. No. | 727,890 |
| [22] | Filed | May 9, 1968 |
| [45] | Patented | Jan. 12, 1971 |
| [32] | Priority | Feb. 16, 1968 |
| [33] | | France |
| [31] | | 140076 |

[54] MACHINE FOR MAKING PUFF PASTE
19 Claims, 12 Drawing Figs.

[52] U.S. Cl. .................................................. 107/4, 107/69
[51] Int. Cl. ................................................... A21c 7/01
[50] Field of Search .................................... 107/4, 4.2, 4.5, 7.6, 9.3, 9.6, 10, 12, 68, 69; 118/13, 15

[56] References Cited
UNITED STATES PATENTS

| 1,263,929 | 4/1918 | Rios ............................. | 107/69 |
| 1,527,262 | 2/1925 | Martin .......................... | 107/69 |
| 2,434,339 | 1/1948 | Stiles ........................... | 107/69X |
| 2,612,851 | 10/1952 | Morrison ..................... | 107/12 |
| 2,735,379 | 2/1956 | Stiles ........................... | 107/12 |
| 2,756,459 | 7/1956 | Kellner ........................ | 107/69X |
| 2,892,422 | 6/1959 | Casale ......................... | 107/69X |

Primary Examiner—Laverne D. Geiger
Assistant Examiner—Robert I. Smith
Attorney—Robert E. Burns ABSTRACT: A machine for making puff paste (obtained by superimposition of layers of dough spaced by fatty material), which comprises at least one delivery belt bringing the superimposed layers of dough under rollers, flattening them against support means located under the belt forming a flattening station and at least another belt transferring the dough coming out from this station to means for cutting the dough in parallel strips, other belts for transferring the cut strips of dough and for superimposing them and at least one belt for transferring the stack thus obtained to a conveyor belt for bringing the stack to another flattening station, the time needed for this last transfer determining the rest period necessary for the operation.

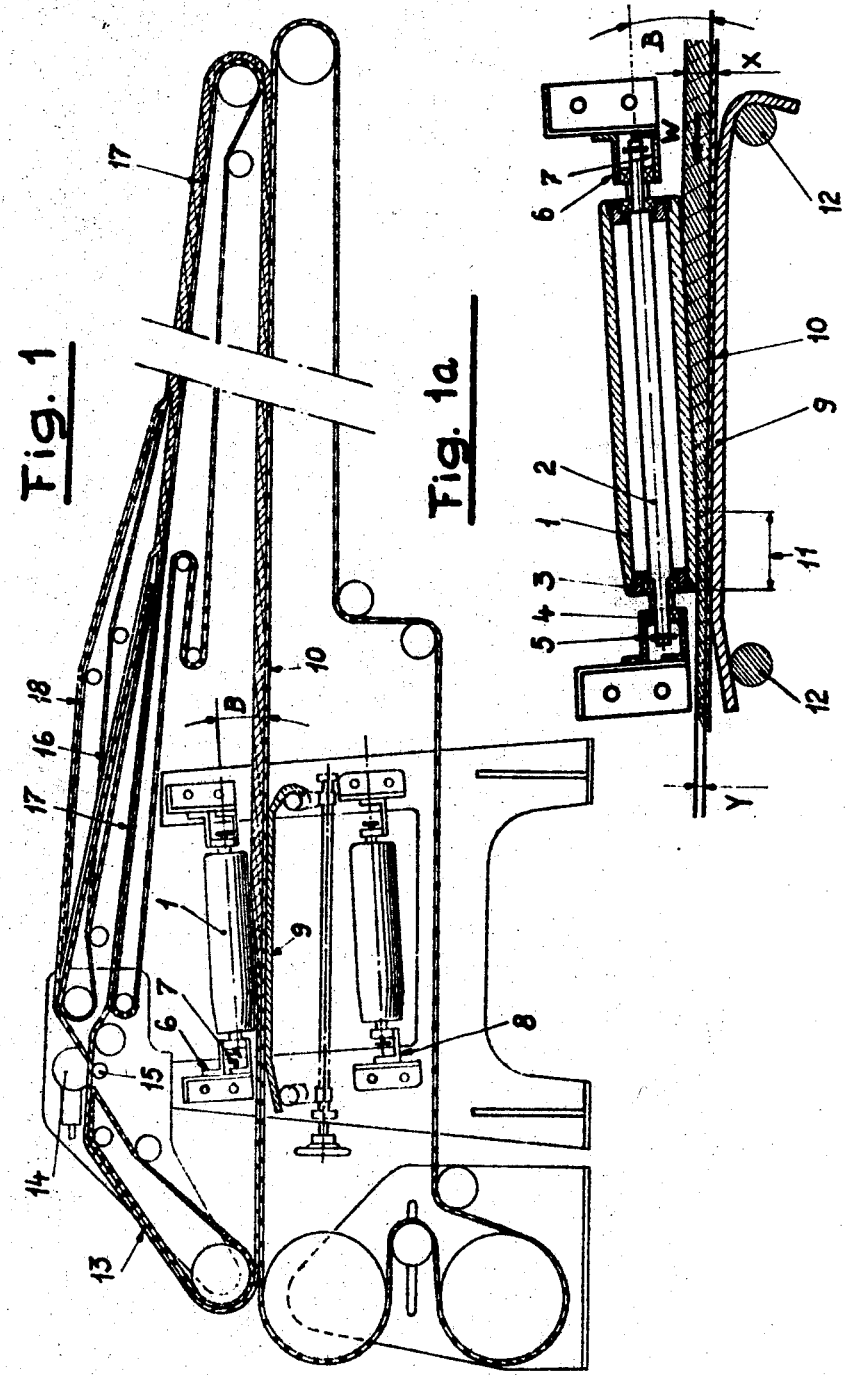

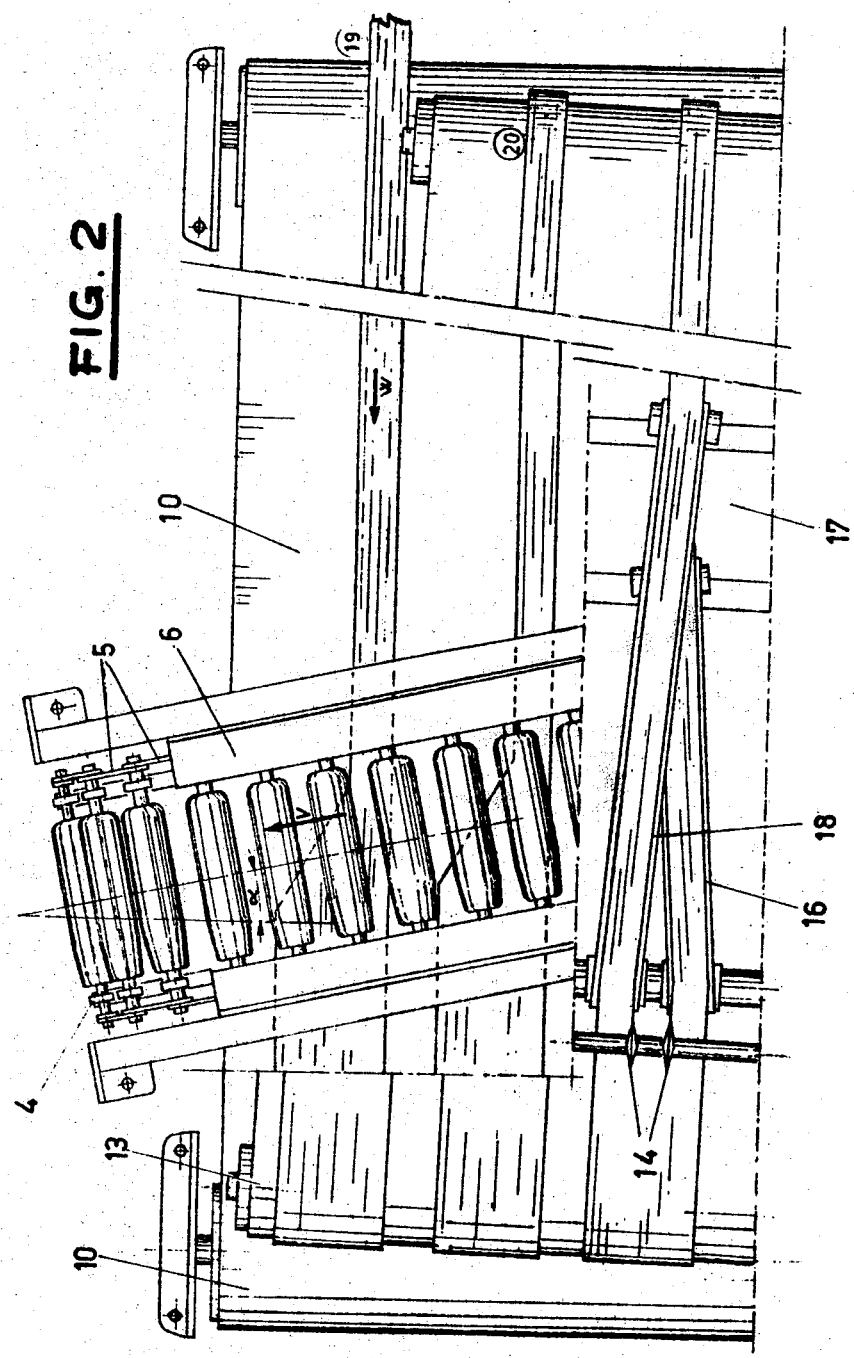

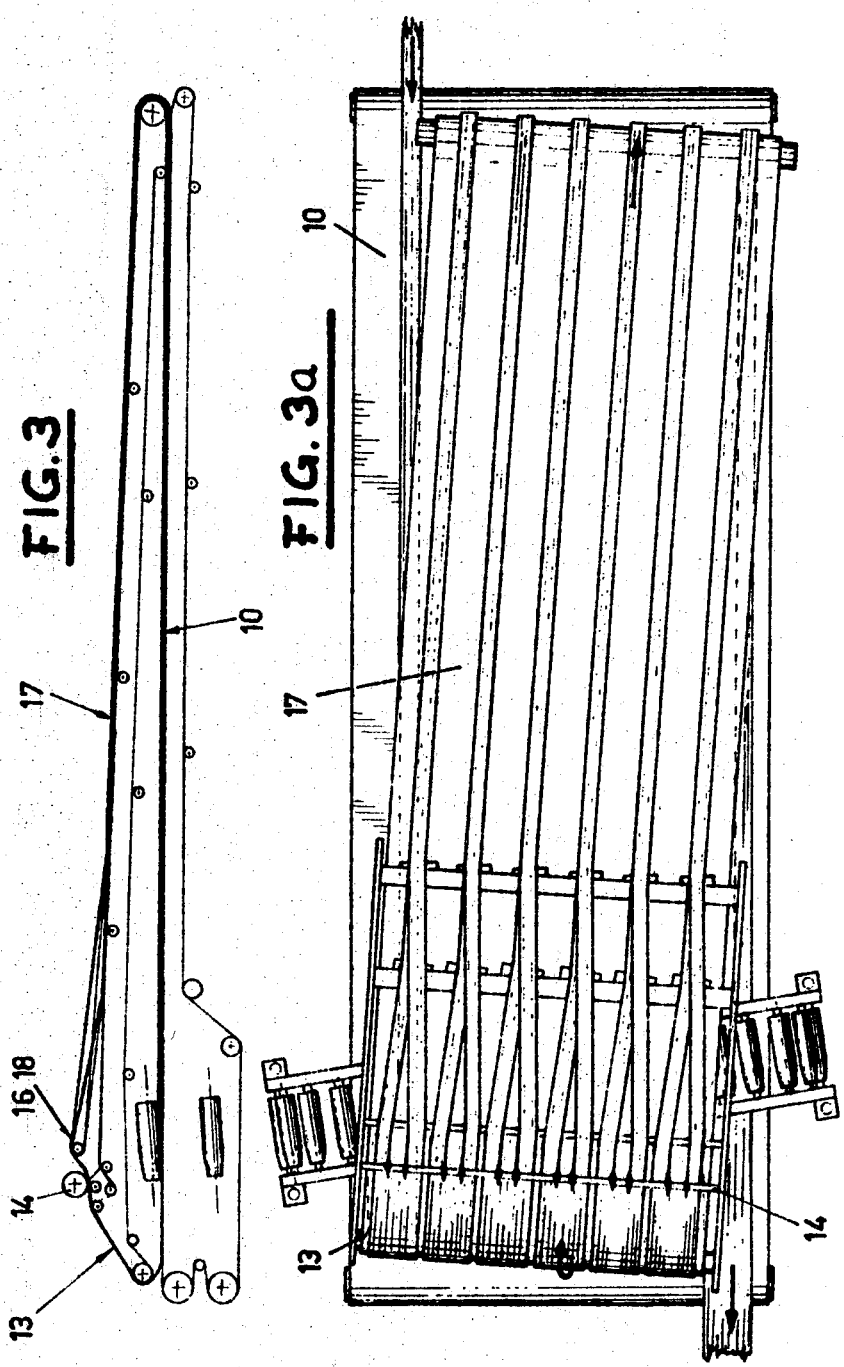

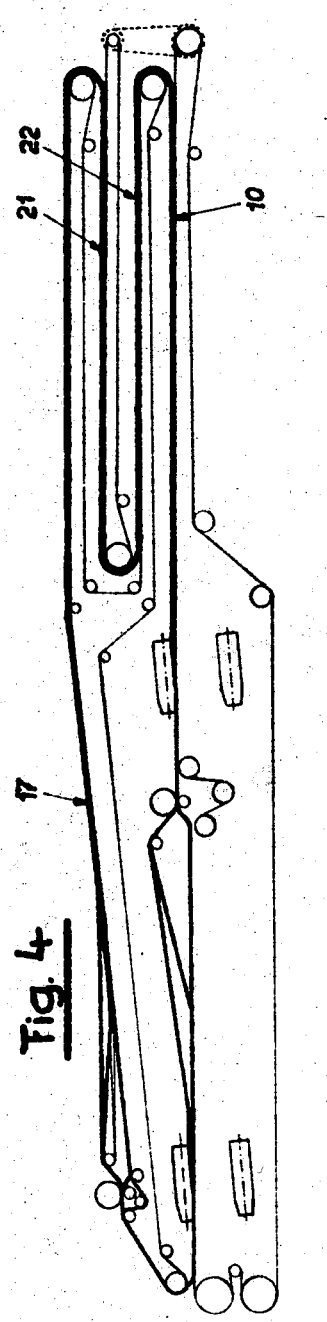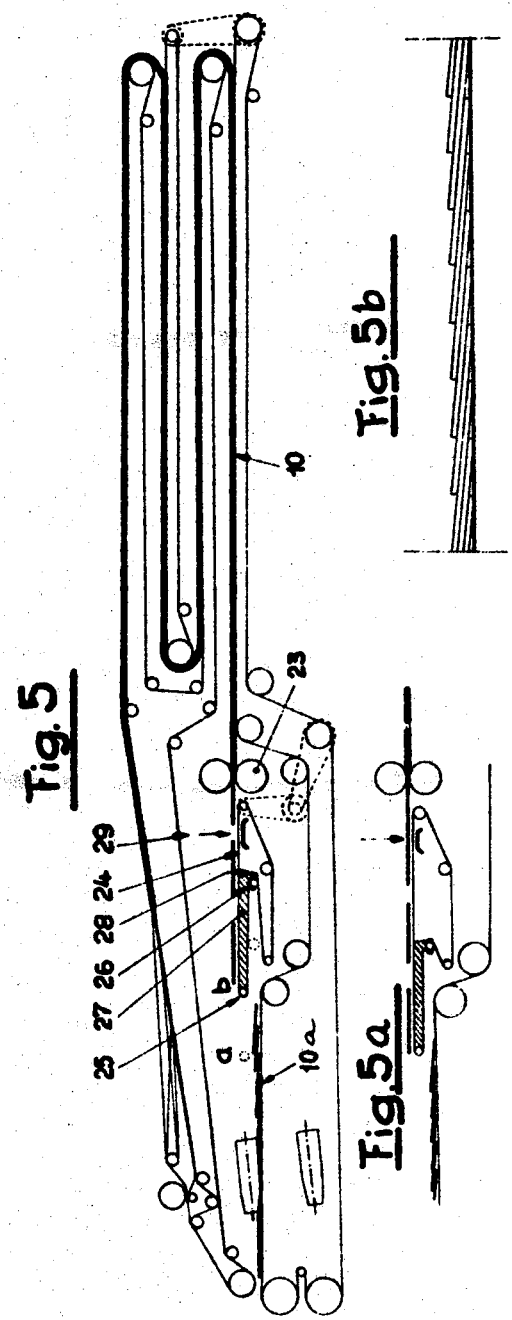

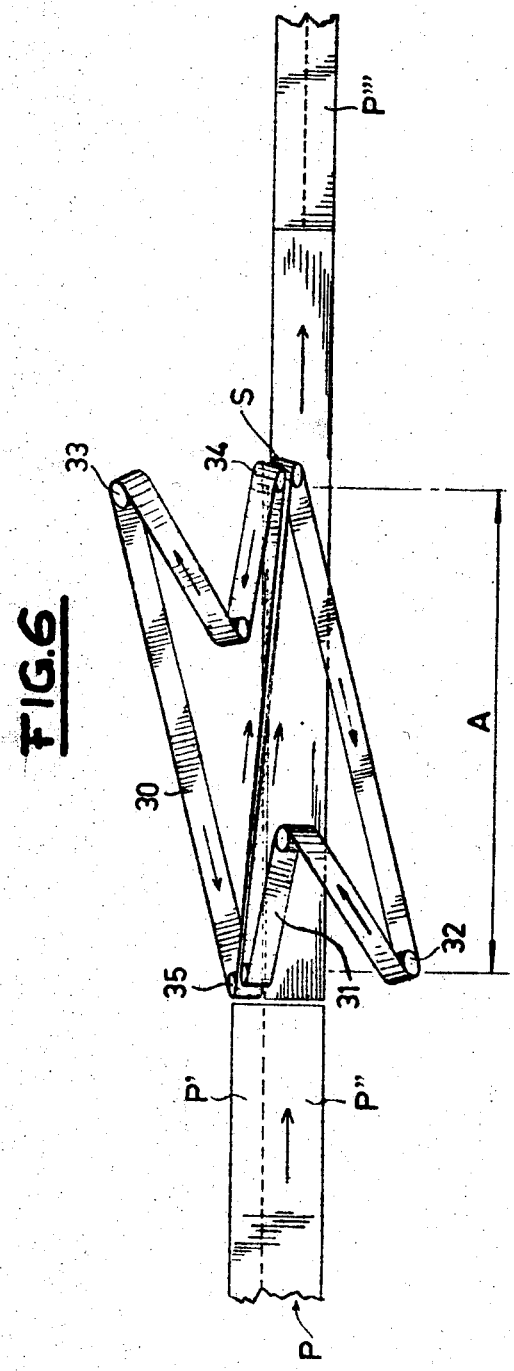
FIG. 6
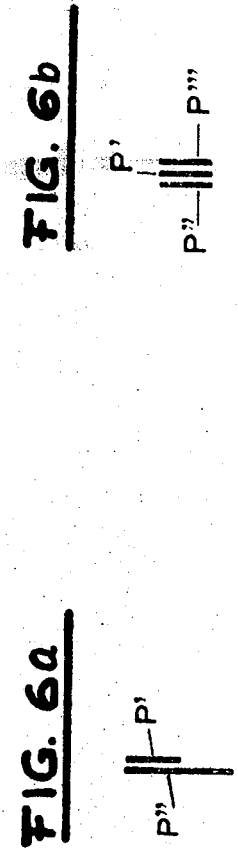
FIG. 6a
FIG. 6b

MACHINE FOR MAKING PUFF PASTE

The present invention has for its purpose to make an industrial high output machine for making puff paste, which machine shall be entirely automatic. It is known that the puffing of a paste or dough is obtained generally by successive rolling or laminating generally to the number of six each followed by folding of the dough on itself, the lumps thus obtained being allowed to rest for a certain time between each operation of laminating and folding. The rest time varies from 45 to 60 minutes according to the quality of the dough.

The fabrication of such puff paste is generally manual and results accordingly in small lumps. Besides, culinary tradition requires that there be proceeded with flattenings which are crossed relative to one another, two flattenings followed by folding taking place successively and followed by a rest time of about 15 minutes.

Each lump initially consists of two layers of dough spaced by a layer of oily material. It is the successive stacking resulting from folding, which stacking is each time flattened to the original thickness, which causes the formation of strata in the layer of dough, each of these strata being spaced from its neighbors by fatty or oily layers.

The crossing of the flattenings and the need for rest between each couple of operations have not heretofore made it possible to make machines which meet these two requirements and which automatically manufacture puff paste. However, such automatizing is useful bearing in mind that the manual operations needed considerably increase the cost of such dough. It has been noted that crossed flattening instead of a unidirectional flattening does not substantially modify the results obtained after cooking. This work method is rendered necessary on the one hand by the use of spaced lumps such that the leading edge and the trailing edge of the flattening device does not deform itself excessively, on the other hand by a good distribution of the fatty material inside the dough. It is for this reason that certain machines intended for the manufacture of puff paste have been made in which the dough is folded indefinitely upon itself lengthwise. They have thus the major drawback of permitting only a series of lengthwise folds. Because of this, the result obtained is much inferior to the result obtained manually.

The essential goal of the present invention is thus to automatize all the manual conventional operations required in making puff paste, separated by the desired rest time, in order that the dough coming out of the machine may be of the same quality for identical constituents, as if it had been made manually.

The machine according to the present invention and intended for the making of puff paste, that is obtained by superimposition of layers of dough separated by oily or fatty bodies, characterized by the fact that it comprises in combination, at least one travelling belt bringing superimposed layers of dough under the rollers, crushing them against bearing means located under the belt, at least one belt transferring the dough coming out from the flattening operation to cutting means for cutting said dough into parallel strips, belts transferring the strips of cut dough and superimposing them, and, finally, at least one belt transferring the stack thus obtained to a belt bringing it to the following flattening operation, the time of this last transfer determining the necessary rest time.

In addition to the automatizing of the various operations and the facile modification of the machine according to the various treatments to be effected, the present device has the following industrial advantages: reduced space requirement as compared with manual apparatus, rest for the dough, possibly in a particular container, without manipulation, production of dough at a variable rate and accordingly synchronizable with the output of the installation.

The invention will be better understood upon reading the following description which is given by way of nonlimiting example and with aid of the accompanying drawing in which:

FIG. 1 is a general vertical cross section of the machine;
FIG. 1a is a detailed cross section of a roller;
FIG. 2 is an underneath view of the machine, the belt for taking up, folding and rest being shown in the lower part of the drawing;
FIGS. 3 and 3a, are views in vertical cross section and from above of a machine for puffing in six simple rotations with crosswise flattening;
FIG. 4 is a view in vertical cross section of a puffing machine operating in three double rotations, with crosswise flattening;
FIG. 5 is a vertical cross section of a puffing machine operating in three double turns with crossed flattening;
FIG. 5a is a detail in cross section of the stacking belt in expanded position;
FIG. 5a is a detail in cross section of the deposit of plates of dough in scale fashion for the formation of folds after lengthwise flattening; and
FIG. 6 and FIG. 6a and FIG. 6b are schematic views showing the principle of folding over of the dough.

With reference to FIGS. 1 to 3a; rollers 1 rotate freely on shafts 2 through bearings 3.

Shaft 2 has at its two ends shoulders on which rotate freely rollers 4. Each roller thus equipped is harnessed to the following ones by plates 5 in order to form a type of endless chain moved at its two ends to toothed wheels, themselves mechanically driven by pinions connected to a reducing motor.

The rollers are guided in the upper part in a rolling path constituted of T-squares 6 and 7, and in the lower part by a T-shaped support 8.

The assembly of the chain is driven in the direction of arrow V according to an axis making an angle $\alpha$ in the direction of the rotational axes of the rollers.

The shaft of each roller and accordingly the entire chain train is inclined relative to table 9 by angle $\beta$. The dough moves along arrow W. Angle $\beta$ is such that said dough being progressively compressed between belt 10 moving on fixed table 9, and the successive passages of rollers 1, flattens from its original thickness X to that necessary for folding Y. Angle $\alpha$ is resultant of the dough incoming speed W and the passage speed of the rollers V, reduced, if necessary, by a certain value in order to cancel out the increase in length that the dough tends to take in the direction W.

During its progressive flattening between the belt and rollers, the dough spreads out in the direction of passage of the rollers. The rollers have a conical part 11 intended to equalize the dough between the two successive passages thereof.

Table 9 is height-adjustable by means of eccentric shafts 12.

After having been flattened, the dough is taken up by a belt 13 and cut into three parallel and continuous strips by passage between, on the one hand, two rotating cutting blades 14, and on the other hand, a bearing cylinder 15. The three strips thus obtained pass on three belts 16, 17, 18. The central belt 17 continues in a straight line, while the side belts 16 and 18, positioned higher than the central one, move obliquely their dough strip and deposit them successively one upon the other.

The dough having entered the machine at 19 on inlet belt 10, is redeposited upon the latter, at 20, by rest belt 17. The same is true after each flattening operation.

The dwell time on belt 17 and on the first part of belt 10 determines the rest time. It can either take place in the open air or inside a refrigerated chamber. In order to reduce volume, belt 17 can be split up into several superimposed belts.

As installation of average capacity of one ton/hour and employing six flattening operations is shown in FIG. 3. A single belt 10 makes possible the six successive flattening operations.

A single belt 13, a single cutting bar 14 and a single rest belt 17 are also necessary being that the width of the strip is about 2 meters. These parts 13 and 17 are additionally only a single and same belt, mechanically connected to belt 10.

Only stacking belts 16 and 18 are multiple but are driven by single shaft.

It is evident that for installations exceeding a ton per hour, it is necessary to split up the belts either in two, in three or in six.

In these instances, instead of giving an angle α tending to retain the dough during its flattening, it is possible to dispose the different inlet belts according to angles which are successively greater. The force of flattening taking place then without sliding, is less than previously.

It is also possible the split up the train of rollers and to simply dispose several juxtaposed and parallel machines mutually fed by their rest belts.

An installation of the same capacity, that is to say one ton/hour by the technique of three double flattening operations, is shown in FIG. 4. It comprises two successive roller trains. A belt of one meter in width only makes possible three flattening operations, each of these being immediately followed by a stacking then by a second flattening, the last stacking being effected upon return of the dough. The waiting time being substantially double that of the previous methods (about fifteen minutes), belts 10 and 17 must have greater lengths or be split up and superimposed along 21 and 22.

For larger quantities, the splitting up of the belts or of the trains of rollers can take place as before.

Another arrangement is possible: it consists in disposing only a single train of rollers; the dough after the first flattening is brought above said train of rollers and immediately after stacking, deposited on the ingoing belt to undergo a second flattening. It is only after the second stacking that it remains on the rest belt before undergoing a second flattening. This arrangement, valid for large quantities requiring separate lines of belts, is difficultly accomplished on a machine which has a single inlet belt.

If it is desired to proceed to the crossing of the flattening operations, it is possible, while retaining the same principle, to make a compact machine which proceeds to flattenings and stackings which are crossed relative to one another.

A conventional flattening device 23, shown in FIG. 5, with two superimposed rollers lengthwise flattens the dough. The increase in length of the strip of dough, on the one hand, and the necessity for forming folds, on the other hand, are resolved by a lengthwise stacking device, constituted by an auxiliary belt 24, disposed after the flattening post and whose useful length is variable. For this purpose, rollers 25 and 26 are fast on a mobile frame 27 which can be moved from a to b. The movement of b towards a takes place at a speed slightly greater than that assumed by the dough after flattening, speed with which is driven belt 10. The driving of frame 27 is due to the tightening of shoe 28 immobilizing roller 26.

Return from a towards b takes place rapidly under the urging of a spring, as soon as shoe 28 is let go, relaxation occurs when belt 24 is completely expanded.

The dough, once flattened, is cut off by a pendular quillotine 29 to form plates. Frame 27 is moved at the speed of the belt. Upon reaching the height of a, the said frame rapidly comes back leaving behind the plate of dough which deposits on belt 10a. The speed of the latter being less than the exit speed of the dough from flattening device 23, the different plates stack up in scale-fashion, as shown in FIG. 5b and in such a way that there appears always three thicknesses of dough at every point. Immediately after, or after a rest period, the dough is flattened through by a train of rollers, according to the procedure above described.

Instead of forming folds by cutting out strips or plates and superimposing these, it is possible to fold mechanically to form folds which resemble more those obtained manually. Folding has the advantage of distributing the fatty material in two opposite directions without being further crossed by the manual method during folding over of the lump. However, given the dimensional uniformity with which the strips of dough and the fatty material are disposed at the entrance of the machine, the regularity and the precision with which the mechanical flattenings are carried out, the fatty material is distributed perfectly which is superior to all manual processes.

Referring to FIG. 6 there is shown a device among others which permits folding the dough on itself, the strip of dough P being cut off longitudinally in order to separate it into two parallel strips P' and P'', the band P' is driven by and between two flat belts 30 and 31 driven by roller devices 32, 33, 34 and 35, etc. while all is well stretched and causing a spin movement in their portion A on their common travel. Band P'' continues on its way in the same direction. The two belts 30 and 31 are disposed in such a way that their separation point S after a common path A be located on the portion P'' of the original strip of dough. They let go when band P' turned over becomes superimposed to band P''. It suffices then to effect a new longitudinal cut off forming another opposite parallel band P''' and another similar device not shown of belts 30 and 31 which turn over this band P''' to obtain, successively, the superimpositions shown in FIGS. 6 bis and 6 ter, sections P', P'' and P''' being separated in exaggerated fashion to facilitate the understanding of the drawing while they are in reality superimposed in intimate contact.

The straight or transverse flattening described above can be then used with the superimposition thus obtained, followed by one or several ordinary cycles, analogous to those described above.

Belts 30 and 31 of the above described device can be replaced by a succession of successive pulleys turning freely around a shaft perpendicular to the plane of the FIG. and aligned along two curves along the same path as the belts.

We claim:

1. Machine for making puffy paste obtained by superimposition of layers of dough separated by fatty bodies, comprising in combination a plurality of rollers, bearing means cooperating with said rollers, at least one belt for bringing superimposed layers of dough under said rollers and for flattening them against said bearing means, at least another belt for transferring said crushed dough, means for cutting said dough into parallel strips communicating with said transfer belt, a plurality of belts communicating with said cutting means for superimposing said strips of dough and at least one additional belt for transferring said stack to an additional flattening section.

2. Machine according to claim 1, having a single train of rollers moving transversely relative to the transfer axis of the dough, each of the rollers comprising said train of rollers being connected to the preceding or following one by a plate, and means for moving said train of rollers and rolls positioned at the extremities of said rollers and rails in which said rolls are able to move for guiding said rollers.

3. Machine according to claim 1, wherein said train of rollers makes a certain angle with a perpendicular to the axis of transfer of the dough for compensating the effect of lengthening of the dough.

4. Machine according to claim 1, wherein said rollers have a truncated extremity for equalizing said dough between two successive passages of the rollers.

5. Machine according to claim 1, wherein said rollers have shafts on which these rotate freely, said shafts being inclined relatively to the axis to transfer of the dough in order to ensure a progressive flattening of superimposed layers of dough.

6. Machine according to claim 1, wherein said bearing means consist of a table, there being means for adjusting the spacing between said table and said rollers so as to determine the final thickness of said dough.

7. Machine according to claim 6, wherein said table has means for adjusting the distance thereof from said rollers.

8. Machine according to claim 1, wherein said bearing means consist of a plurality of tables, there being means for adjusting the space between said tables and said rollers so as to provide different spacing between each table and each roller.

9. Machine according to claim 8, having rails for guiding said rollers for adjusting said spaces.

10. Machine according to claim 1, wherein said cutting means consist of a least one rotating circular blade.

11. Machine according to claim 1, having a plurality of cylinders located at different heights and belts supported by said cylinders to permit separate carrying away of cut strips of paste and bringing thereof to a rest belt in such a way that said strips of dough are shifted relatively to one another and superimposed on one another.

12. Machine according to claim 1, wherein said transfer belts are cut away in successive segments.

13. Machine according to claim 1, wherein said transfer belts consist of separate parallel bands travelling at different speeds.

14. Machine according to claim 1, having a plurality of successive transversal trains of rollers moving at a different speed from said bearing means and at an angle with respect thereto.

15. Machine according to claim 14, having sectioning and superimposition means separating said trains of transversal rollers to permit several successive flattenings without rest.

16. Machine according to claim 1, having a belt for bringing dough to a flattening station, a train of rollers, a belt for bringing dough to a first sectioning assembly, a plurality of belts for transferring and superimposing the sectioned strips, and a second delivery belt for bringing the layers of superimposed dough onto the same train of flattening rollers and additional belts driving the flattened paste under additional sectioning means for superimposing the newly cut strips and transferring them on the rest belt before a new cycle.

17. Machine according to claim 1, having at least one assembly comprising a pair of cylinders for flattening therebetween superimposed layers of dough, said cylinders having axes of rotation normal to their movement, a knife for cutting the flattened strip into successive portions, an intermediate belt having a to-and-fro movement for transferring and superimposing the plates of dough obtained onto a delivery belt leading to a station for transverse flattening.

18. Machine according to claim 1, having at least one device for transversely folding the dough upon itself, and consisting of at least one knife for cutting a longitudinal strip of dough and at least two belts stretched and moved by rollers and effecting a spin movement in their parallel paths and gripping therebetween the cut strip of dough and laying it down at the end of their parallel path on another band of dough which has continued its normal path.

19. Machine according to claim 18, having two juxtaposed pulleys for turning over the dough.